T. T. SEAL.
LENS FOR HEADLIGHTS.
APPLICATION FILED JAN. 30, 1917.

1,238,446.

Patented Aug. 28, 1917.

INVENTOR.
T. T. Seal.
BY
N. E. Dunlap
ATTORNEY.

UNITED STATES PATENT OFFICE.

THEODORE T. SEAL, OF BELLAIRE, OHIO.

LENS FOR HEADLIGHTS.

1,238,446.  Specification of Letters Patent.  Patented Aug. 28, 1917.

Application filed January 30, 1917. Serial No. 145,440.

*To all whom it may concern:*

Be it known that I, THEODORE T. SEAL, a citizen of the United States of America, and resident of Bellaire, county of Belmont, and State of Ohio, have invented certain new and useful Improvements in Lenses for Headlights, of which the following is a specification.

This invention relates broadly to headlight lenses, and more particularly to a glass or lens for the headlights of automobiles and like vehicles.

The primary object of the invention is to provide a glass or lens capable of intercepting and modifying certain light rays emanating from the lamp or light source of a headlight in such a manner as to effectually eliminate the objectionable dazzling brilliancy or glare which is common to headlights equipped with the usual plain glass lenses.

A further object is to provide a device of the character mentioned whereby the intensity of the projected rays is effectively subdued to the extent that the glare is obviated without unduly decreasing the road-illuminating efficiency of the headlight.

With these and other objects in view, the invention resides in the features of construction which will hereinafter be fully described, reference being had to the accompanying drawings, in which—

Figure 1:
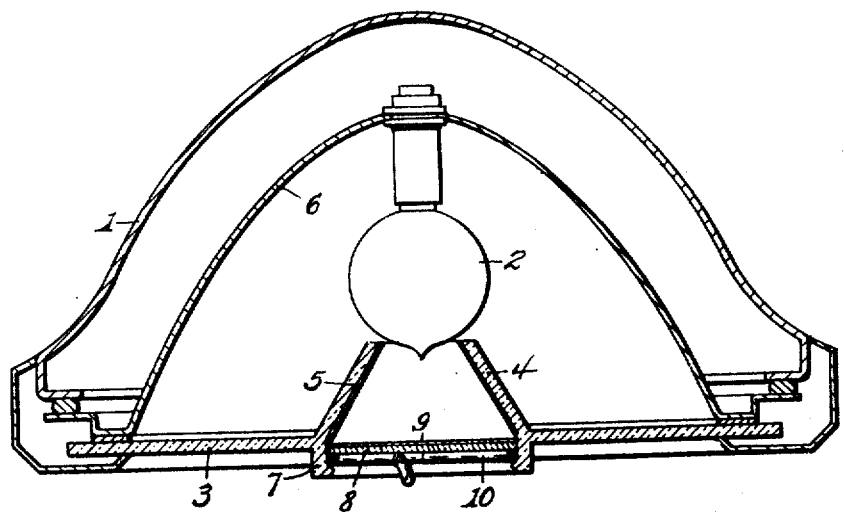
Figure 1 is a central section of an automobile headlight equipped with my invention, and—
Figure 2:
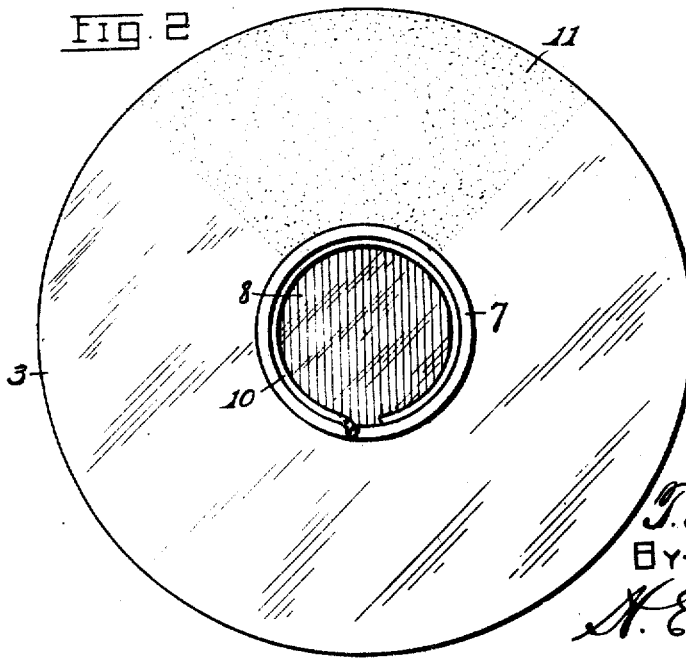
Fig. 2 is a front elevation of the invention.

Referring to said drawings, 1 indicates generally the body of an automobile headlight and 2 the lamp of such headlight. Mounted in said headlight in the usual manner is the lens which constitutes the present invention, the same comprising a centrally apertured plate-like glass body 3 of circular form and an integral rearwardly-directed hollow cone 4 of truncated form disposed in encircling relation to the aperture of said body and designed to be closely approached by the lamp 2, as shown in Fig. 1. The inner surface of said cone is provided with a coating 5 of silver or other suitable light-reflecting material which is designed to intercept and reflect at a different angle those rays of light reflected by the reflector 6 which tend to produce the glare.

Coincident with the outer end of the cone 4 is an integral forward extension 7 of cylindrical form designed to receive within its embrace a circular semi-transparent plate or member 8, preferably of glass having a coating 9 of a suitable glass color applied thereto, but which may be formed of celluloid or colored glass. Said member 8, which is secured in place in any suitable manner, as by means of a seating ring 10 of spring steel, is designed to intercept and subdue those direct rays of light emanating from the lamp 2 which would otherwise tend to dazzle the eyes of one within direct range.

The upper portion of the main body portion 2 is preferably rendered translucent by frosting, as shown at 11, for softening or subduing those objectionable glare-producing rays reflected from the upper portion of the headlight which are not modified by the parts of the device hereinbefore described.

While the construction described results in reducing to some extent the volume of light transmitted, this is not readily apparent to the driver of a car equipped with the invention, for the reason that, whereas, under the untempered projected rays of an ordinary head-light, objects or inequalities in the roadway appear exaggerated or cause such shadows as to produce confusion concerning their nature and extent, these inequalities are rendered more readily distinguishable and less deceptive under the subdued light transmitted through the lens herein described. In other words, while my device does decrease to some extent the quantity of transmitted light, the illumination is not appreciably inferior to that of headlights equipped with plain glass lenses.

It will be noted that the form of the main body 3 with the integral cone 4 and extension 7 is such that the same may be formed by ordinary pressing methods practised and well understood in the glass-making art.

What is claimed is—

1. A headlight lens comprising a centrally apertured plate-like glass body, a hollow truncated light-reflecting cone encircling the aperture of said body and extending rearward therefrom, and a translucent member mounted in closing relation to said aperture.

2. A headlight lens comprising a centrally apertured plate-like glass body, a hollow truncated light-reflecting cone encircling the aperture of said body and extending rearward therefrom, a forwardly directed extension formed integral with said body and disposed in encircling relation to said aperture, and a translucent member mounted within said extension.

3. A headlight lens comprising a centrally apertured plate-like glass body, an integral rearwardly-extending hollow truncated cone carried by said body in encircling relation to the aperture of the latter, said cone being coated to provide a light-reflecting surface, and a light-subduing medium disposed in closing relation to said aperture.

4. A headlight lens comprising a centrally apertured plate-like glass body, a hollow truncated light-reflecting cone encircling the aperture of said body and extending rearward therefrom, and a light-subduing medium disposed in closing relation to said aperture.

5. A headlight lens comprising a centrally apertured plate-like glass body, a hollow truncated light-reflecting cone encircling the aperture of said body and extending rearward therefrom, a forwardly directed extension formed integral with said body and disposed in encircling relation to said aperture, and a light-subduing medium mounted within said extension.

6. A headlight lens comprising a centrally apertured plate-like glass body, an integral rearwardly-extending hollow truncated cone carried by said body in encircling relation to the aperture of the latter, said cone being silvered interiorly, and a light-subduing medium removably mounted in closing relation to said aperture.

7. A headlight lens comprising a centrally apertured plate-like glass body, a hollow truncated light-reflecting cone encircling the aperture of said body and extending rearward therefrom, a forwardly directed extension formed integral with said body and disposed in encircling relation to said aperture, and a light-subduing medium mounted within the embrace of said extension.

8. A headlight lens comprising a centrally apertured plate-like glass body, an integral rearwardly-extending hollow truncated cone carried by said body in encircling relation to the aperture of the latter, said cone being silvered interiorly, and a translucent glass plate mounted within the embrace of said extension.

9. A headlight lens comprising a centrally apertured plate-like glass body, an integral rearwardly-extending hollow truncated cone carried by said body in encircling relation to the aperture of the latter, said cone being coated to provide a light-reflecting surface, and a translucent glass plate disposed in closing relation to said aperture.

10. A headlight lens comprising a centrally apertured plate-like glass body having a translucent upper portion, an integral hollow light-reflecting cone of truncated form located in encircling relation to the aperture of said body and extending rearward therefrom, and a light-subduing plate disposed in closing relation to said aperture.

In testimony whereof, I affix my signature in presence of two subscribing witnesses.

THEODORE T. SEAL.

Witnesses:
H. E. DUNLAP,
W. F. KEEFER.